United States Patent
Shin

(10) Patent No.: US 9,894,132 B2
(45) Date of Patent: Feb. 13, 2018

(54) DATA STORAGE METHOD AND SYSTEM OF PORTABLE TERMINAL

(71) Applicant: Samsung Electronics Co. Ltd., Suwon-si, Gyeonggi-do (KR)

(72) Inventor: Sangmin Shin, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 604 days.

(21) Appl. No.: 14/012,454

(22) Filed: Aug. 28, 2013

(65) Prior Publication Data

US 2014/0068015 A1 Mar. 6, 2014

(30) Foreign Application Priority Data

Aug. 29, 2012 (KR) .................. 10-2012-0094780

(51) Int. Cl.
| | |
|---|---|
| *G06F 15/16* | (2006.01) |
| *H04L 29/08* | (2006.01) |
| *H04W 4/00* | (2018.01) |
| *G06F 17/30* | (2006.01) |
| *H04M 1/725* | (2006.01) |

(52) U.S. Cl.
CPC ........ *H04L 67/02* (2013.01); *G06F 17/30575* (2013.01); *H04L 67/04* (2013.01); *H04L 67/1095* (2013.01); *H04L 67/1097* (2013.01); *H04W 4/00* (2013.01); *H04M 1/72569* (2013.01)

(58) Field of Classification Search
CPC ..... H04L 67/02; H04L 67/1097; H04L 67/04; G06F 17/30575; G06F 17/30; H04M 1/00; H04M 1/72569; H04W 4/00

USPC ........ 709/219, 216, 217; 711/166, 160, 170; 370/331

See application file for complete search history.

(56) References Cited

U.S. PATENT DOCUMENTS

| | | | | |
|---|---|---|---|---|
| 2004/0044649 | A1* | 3/2004 | Yamato | G06F 11/1456 |
| 2004/0199740 | A1* | 10/2004 | Makela | G06F 12/023 711/170 |
| 2005/0203682 | A1* | 9/2005 | Omino | H04L 12/2856 701/24 |
| 2006/0035713 | A1* | 2/2006 | Cockerille | G07F 17/323 463/42 |
| 2008/0005121 | A1* | 1/2008 | Lam | G06F 17/30067 |

(Continued)

*Primary Examiner* — Thuong Nguyen
(74) *Attorney, Agent, or Firm* — Jefferson IP Law, LLP

(57) ABSTRACT

A data storage method and system of the portable terminal for storing data efficiently through a synchronization service are provided. The data storage method of a portable terminal includes determining whether a residual storage space of a data storage region of the portable terminal is equal to or less than a predetermined threshold value, performing, when the residual storage space is equal to or less than the threshold value, a packet data protocol context activation procedure, determining whether a new data save command is detected, storing, when the new data save command is detected, the new data in the residual storage space, and increasing the residual storage space to be equal to or greater than the threshold value by at least one of deleting synchronization-complete data among synchronization-enabled data stored in the portable terminal and transferring synchronization-incomplete data to a predetermined synchronization service server.

19 Claims, 8 Drawing Sheets

(56) References Cited

U.S. PATENT DOCUMENTS

| | | | |
|---|---|---|---|
| 2008/0028099 A1* | 1/2008 | M.P. .......................... | H04L 12/66 709/238 |
| 2008/0263568 A1* | 10/2008 | Kusuda ................... | G06F 9/485 719/320 |
| 2009/0070344 A1* | 3/2009 | Espelien ................. | H04L 67/10 |
| 2009/0282125 A1* | 11/2009 | Jeide ................... | H04L 67/1095 709/217 |
| 2010/0005532 A1* | 1/2010 | Van Steenbergen ... | G06Q 10/10 726/28 |
| 2010/0161752 A1* | 6/2010 | Collet ................... | H04L 67/104 709/216 |
| 2010/0235600 A1* | 9/2010 | Vitanov ................. | G06F 9/485 711/166 |
| 2011/0022986 A1* | 1/2011 | Dumais .................... | G06F 8/60 715/835 |
| 2013/0042064 A1* | 2/2013 | Simionescu ........ | G06F 12/0871 711/118 |
| 2013/0326168 A1* | 12/2013 | Chang .................... | G06F 9/485 711/160 |
| 2013/0326465 A1* | 12/2013 | Jain .......................... | G06F 8/77 717/100 |
| 2014/0052689 A1* | 2/2014 | Ficara ............... | G06F 17/30174 707/610 |
| 2014/0068015 A1* | 3/2014 | Shin ................. | G06F 17/30575 709/219 |

\* cited by examiner

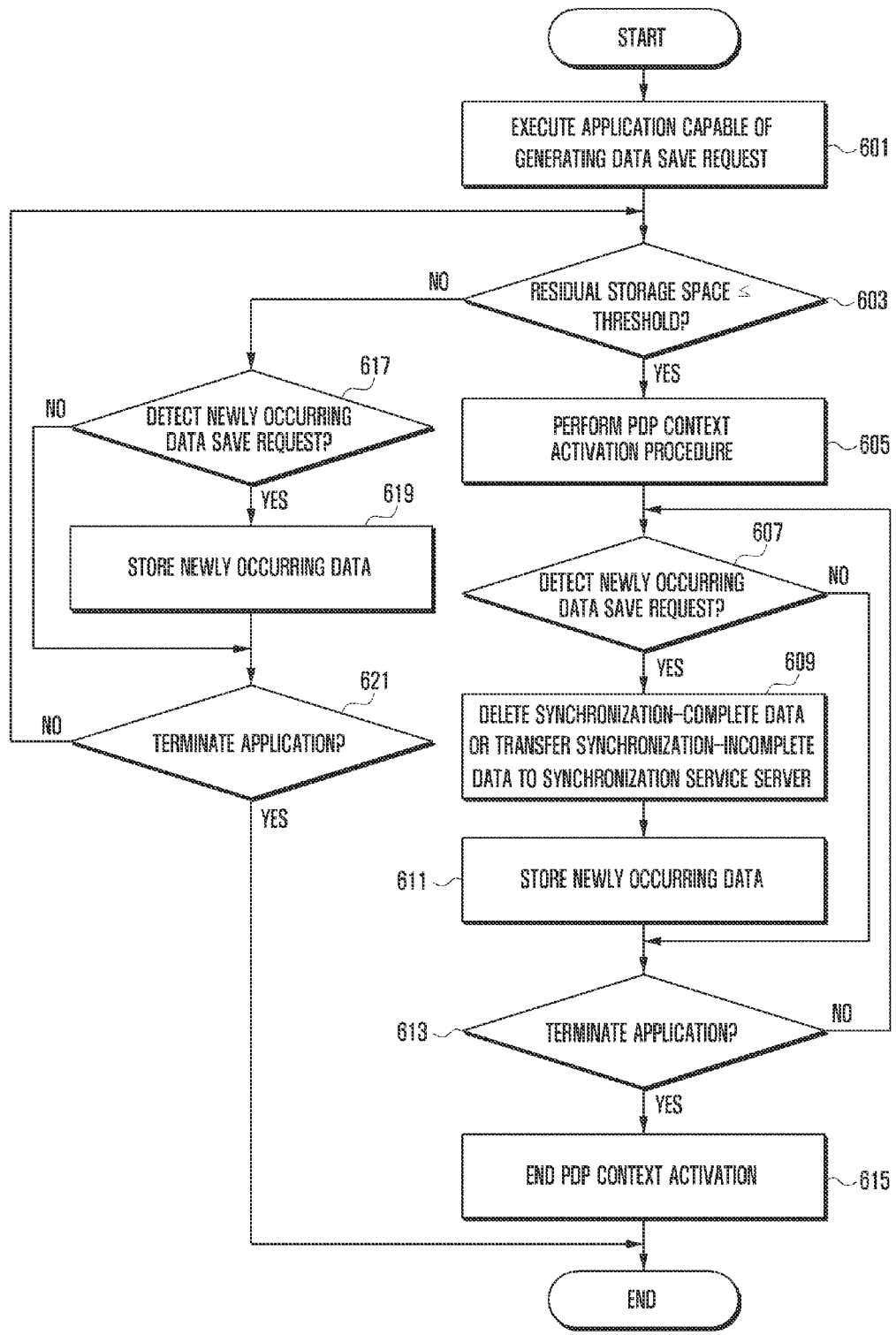

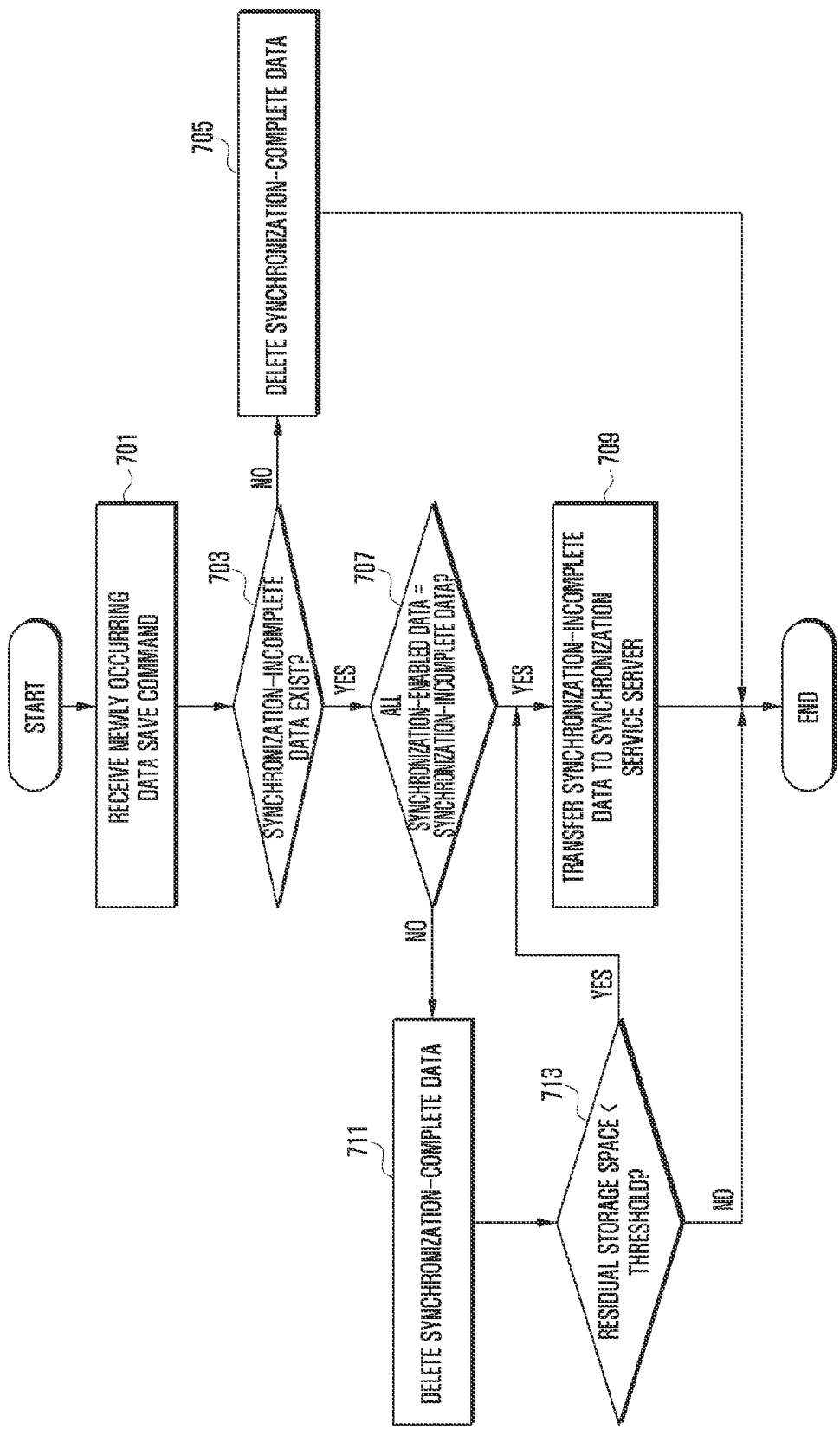

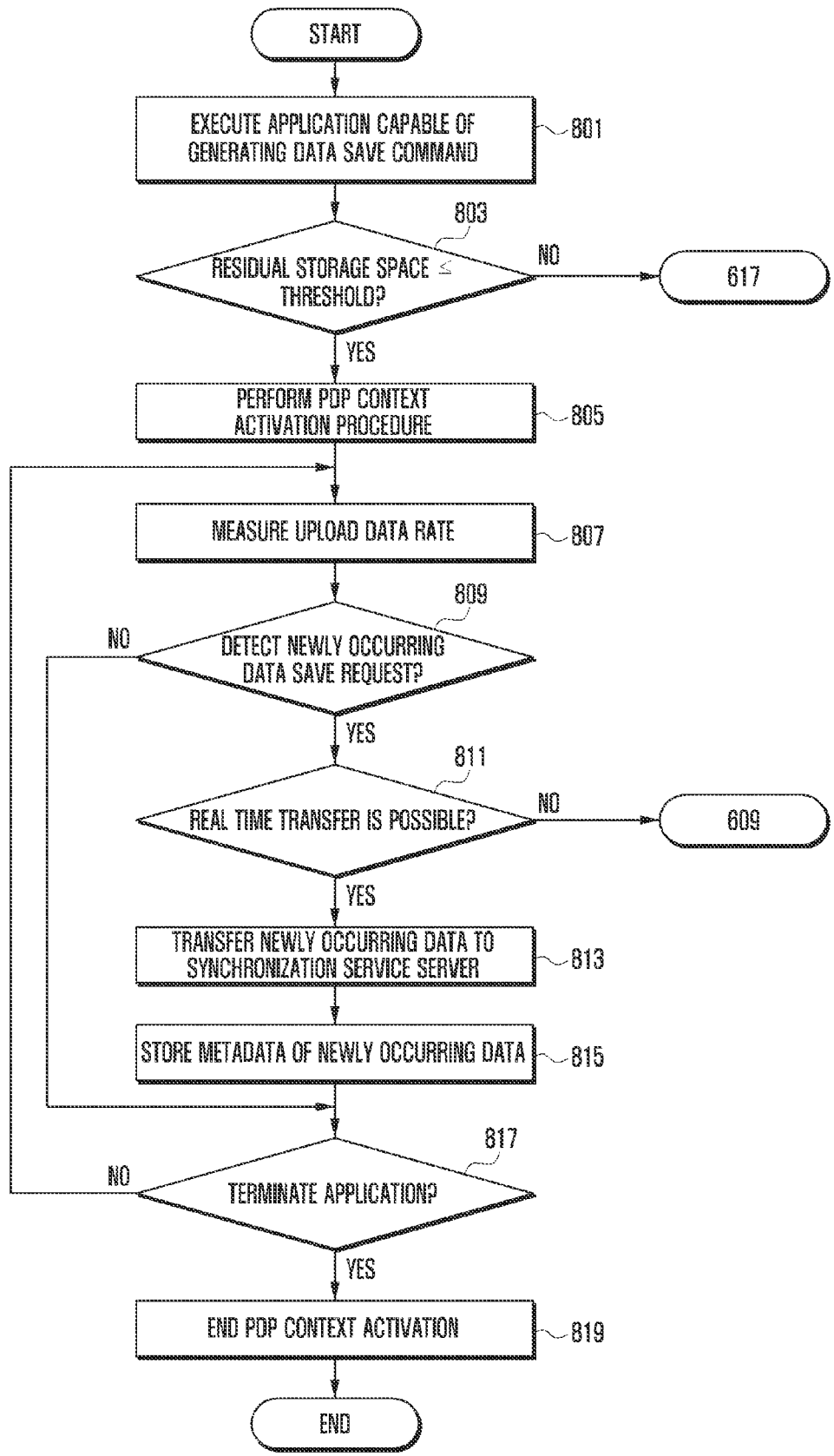

DATA STORAGE METHOD AND SYSTEM OF PORTABLE TERMINAL

PRIORITY

This application claims the benefit under 35 U.S.C. § 119(a) of a Korean patent application filed on Aug. 29, 2012 in the Korean Intellectual Property Office and assigned Serial No. 10-2012-0094780, the entire disclosure of which is hereby incorporated by reference.

BACKGROUND OF THE INVENTION

1. Field of the Invention:

The present invention relates to a data storage method and system of a portable device. More particularly, the present invention relates to a data storage method and system of the portable terminal for storing data efficiently through a synchronization service.

2. Description of the Related Art:

Portable terminals are equipped with diverse functions for fulfilling user needs. For example, a portable terminal according to the related art that is equipped with a camera is capable of capturing pictures as well as receiving a picture from another terminal and storing and managing the pictures. The portable terminal according to the related art may also be capable of storing and managing a phonebook including contact information such as phone numbers of other terminals. The portable terminal according to the related art may be configured such that the phonebook provides the contact information in response to a user request. The portable terminal according to the related art may also provide the user with various useful function items in order for the user to selectively use the various functions of the portable terminal.

The portable terminal according to the related art also provides a data storage function. For example, the portable terminal is capable of storing audio files, video files, document files, photo files, and the like. However, the portable terminal according to the related art is limited in storage space. Accordingly, if the data to be newly stored is larger the residual storage space, the portable terminal according to the related art cannot store the corresponding data. For example, if the storage space is running short and a still or motion picture is being captured by the portable terminal according to the related art, then the portable terminal according to the related art stops capturing the picture. At this time, in order to continue taking pictures, the user must delete previously stored data in order to secure sufficient storage space to store the new data. Requiring a user to delete enough data to make sufficient storage space available for a picture data causes a problem in that the user may miss the perfect timing to capture the still or motion picture. Meanwhile, with the advance in storage technology and computing technologies, the portable terminal is evolving to meet the storage needs to some extent. For example, the data size of a motion picture recorded for 10 minutes with the high performance camera (e.g. 800-million pixel camera) is approximately a few gigabytes. Accordingly, the portable terminal equipped with such a high resolution camera must have a few gigabytes of residual storage space in order for the portable terminal to capture and store a respectively large moving picture. For example, the portable terminal according to the related art has a drawback in that when the storage space is exhausted the ongoing motion picture recording is stopped unintendedly. For the same reason, the portable terminal according to the related art fails storing the still picture taken with the camera module.

There is therefore a need of a method for preventing the unintentional failure of storing newly recorded data as a result of lack of storage space.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of present invention are to address the above-mentioned problems and/or disadvantages and to provide at least the advantages described below. Accordingly, an aspect of the present invention to provide a data storage method and system of a portable terminal that is capable of preventing the newly recorded data from missing unintendedly due to the lack of storage space.

In accordance with an aspect of the present invention, a data storage method of a portable terminal is provided. The method includes determining whether a residual storage space of a data storage region of the portable terminal is equal to or less than a predetermined threshold value, performing, when the residual storage space is equal to or less than the threshold value, a packet data protocol context activation procedure, determining whether a new data save command is detected, storing, when the new data save command is detected, the new data in the residual storage space, and increasing the residual storage space to be equal to or greater than the threshold value by at least one of deleting synchronization-complete data among synchronization-enabled data stored in the portable terminal and transferring synchronization-incomplete data to a predetermined synchronization service server.

In accordance with another aspect of the present invention, a data storage system is provided. The system includes a portable terminal which performs, when a residual storage space is equal to or less than a threshold value, a packet data protocol context activation procedure, stores, when a new data save command is detected, a new data in the residual storage space, and performs at least one of deleting synchronization-complete data among synchronization-enabled data stored in the portable terminal and transferring synchronization-incomplete data to a predetermined synchronization service server; and a synchronization service server which stores the synchronization-enabled data transferred by the portable terminal.

In accordance with another aspect of the present invention, a potable terminal is provided. The terminal includes a transceiver which establishes a communication channel to a predetermined synchronization service server for communicating synchronization-enabled data, a storage unit having a data storage region, and a control unit which controls determining whether a residual storage space of a data storage region of the portable terminal is equal to or less than a predetermined threshold value, performing, when the residual storage space is equal to or less than the threshold value, a packet data protocol context activation procedure, determining whether a new data save command is detected, storing, when the new data save command is detected, the new data in the residual storage space, and increasing the residual storage space to be equal to or greater than the threshold value by at least one of deleting synchronization-complete data among synchronization-enabled data stored in the portable terminal and transferring synchronization-incomplete data to a predetermined synchronization service server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is a flowchart illustrating a data storage method of a portable terminal according to a first exemplary embodiment of the present invention;

FIG. 7 is a flowchart illustrating an extra storage space securing procedure of a data storage method according to an exemplary embodiment of the present invention; and FIG. 8 is a flowchart illustrating a data storage method of a portable terminal according to a second exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification and drawings are to be regarded in an illustrative rather than a restrictive sense in order to help understand the present invention. It is obvious to those skilled in the art that various modifications and changes can be made thereto without departing from the broader spirit and scope of the invention.

Figure 1:
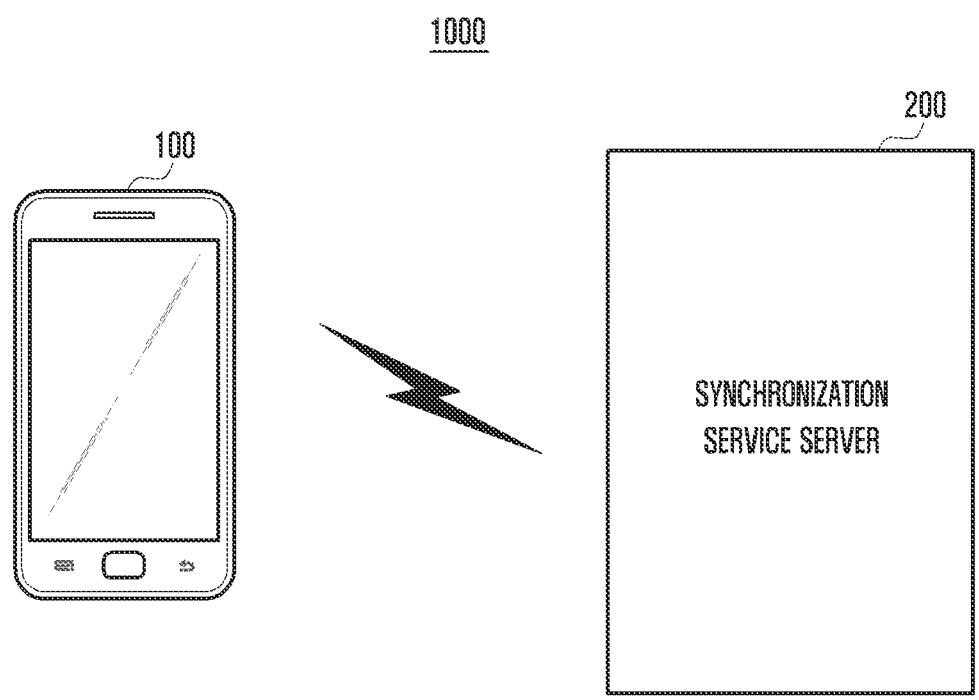
FIG. 1 is a schematic diagram illustrating an architecture of a data storage system according to an exemplary embodiment of the present invention.

FIG. 1 is a schematic diagram illustrating an architecture of a data storage system according to an exemplary embodiment of the present invention.

Referring to FIG. 1, the data storage system 1000 according to an exemplary embodiment of the present invention includes a portable terminal 100 and a synchronization service server 200. The portable terminal 100 and the synchronization service server 200 may be connected through a network such as, for example, the Internet (not shown), and the portable terminal 100 may connect to the Internet through radio communication network such as a Wi-Fi network, a WiBro network, a cellular network, and the like.

The portable terminal corresponds to a terminal having a restricted data storage capacity and may be configured for providing a data synchronization service. The portable terminal may be any of a laptop computer, a Personal Digital Assistant (PDA), a tablet Personal Computer (PC), a hand-held computer, a Portable Multimedia Player (PMP), and the like. However, the exemplary embodiments of the present invention are not limited to such portable terminals. For example, exemplary embodiments of the present invention can be applied to an Internet Protocol Television (IPTV) supporting data storage function (e.g., broadcast program recording and time machine functions) and a desktop PC.

The portable terminal 100 includes a data storage section for storing data. The data storage section is capable of storing at least one of synchronization-enabled data and synchronization-disabled data. The synchronization-enabled data may include at least one of synchronization-complete data synchronized with the synchronization service server 200 and synchronization-incomplete data not synchronized with the synchronization service server 200. According to an exemplary embodiment of the present invention, if the residual storage space is less than a predetermined threshold value, the portable terminal 100 may perform a Packet Data Protocol (PDP) context activation procedure; may store, if a newly occurring data save request is detected, the new data; and may increase the residual storage space to be greater than the threshold value by deleting the synchronization-complete data or by moving the synchronization-incomplete data to the synchronization service server.

If the residual storage space is less than the threshold value, the portable terminal 100 may perform PDP context activation and may measure the data rate (e.g., preferably an upload data rate) with the synchronization service server 200. If the measured data rate is equal to or greater than a predetermined threshold data rate, the portable terminal 100 may transmit the new data to the synchronization service server 200, and the new data may be stored in the synchronization service server 200, other than storing the new data in the residual storage space. A detailed description on the portable device 100 is provided in relation to FIGS. 2 to 8.

The portable terminal 100 is capable of connecting to the synchronization service server 200 which provides synchronization service including the cloud service such as, for example, Samsung Personal Cloud (SPC) service (and Network Attached Storage service). The synchronization service server 200 may store the synchronization-enable data as synchronized with the portable terminal 100. The synchronization can be performed periodically. The synchronization also can be triggered by detection of a change (e.g., a modification, a deletion, a movement, or the like) of the synchronization-enable data. The synchronization service includes a uni-directional synchronization service for synchronizing the data of the synchronization service server 200 to the corresponding data of the portable terminal 100 and synchronizing the data of the portable terminal 100 to the corresponding data of the synchronization service server 200 and a bi-directional synchronization service for synchronizing the data stored in the portable terminal 100 and the synchronization service server 200 with the most recently modified data. According to exemplary embodiments of the present invention, the synchronization service server 200 may receive and store the synchronization-incomplete data transmitted by the portable terminal 100 when the residual storage space is less than the threshold value. The synchronization service server 200 may also receive and store the new data transmitted by the portable terminal 100 when the data rate on the connection with the portable terminal 100 is greater than the threshold data rate. The synchronization service server 200 may also receive a synchronization disable message for the synchronization-complete data deleted from the portable terminal 100. A detailed description on the synchronization service server 200 is provided in relation to FIGS. 2 to 8.

Figure 2:
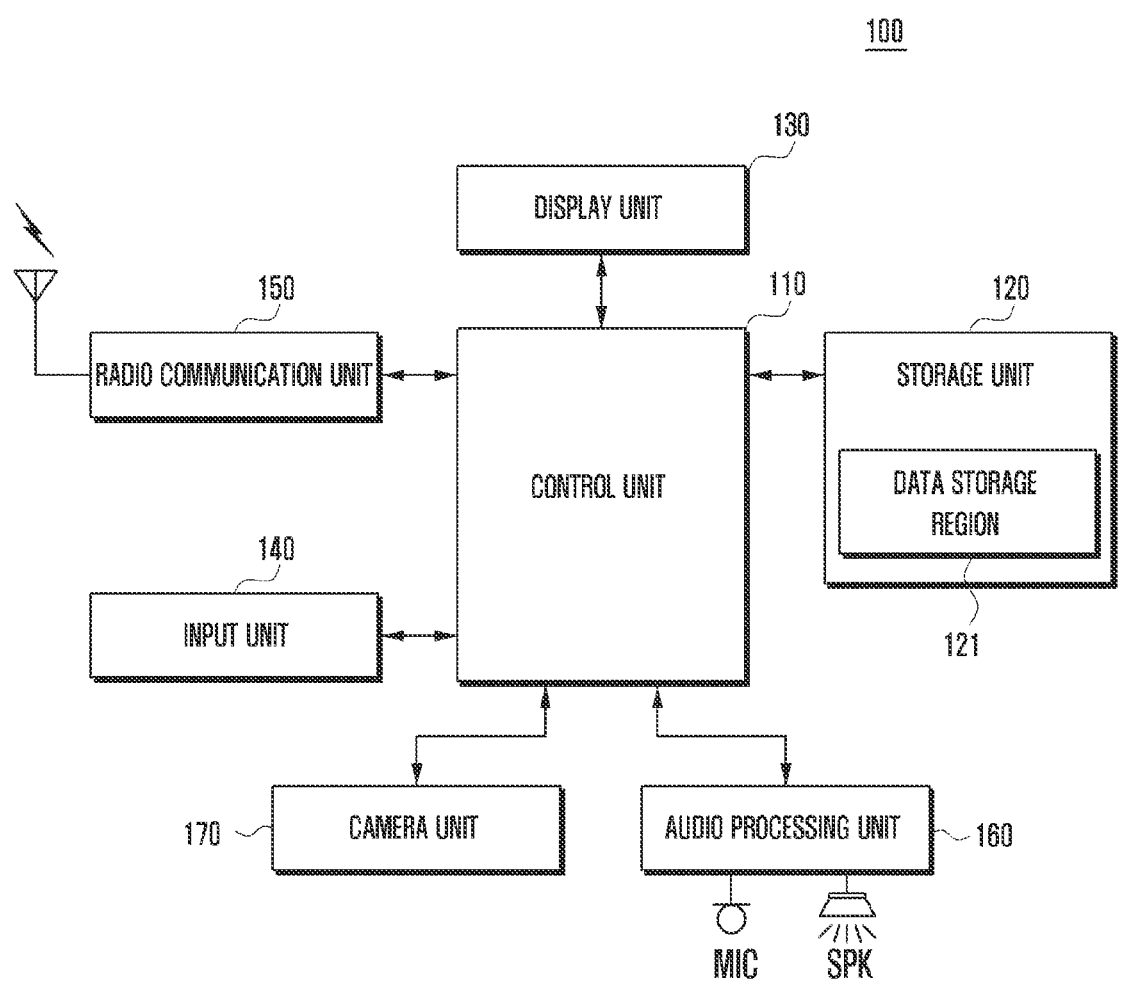
FIG. 2 is a block diagram illustrating a configuration of a portable terminal such as, for example, the portable terminal of FIG. 1 according to an exemplary embodiment of the present invention.

FIG. 2 is a block diagram illustrating a configuration of a portable terminal of FIG. 1 according to an exemplary embodiment of the present invention.

Referring to FIGS. 1 and 2, the portable terminal 100 according to an exemplary embodiment of the present invention includes a control unit 110, a storage unit 120, a display unit 130, an input unit 140, a radio communication unit 150, an audio processing unit 160, and a camera unit 170. The storage unit 120 includes a data storage region 121.

The radio communication unit 150 is responsible for communication function of the portable terminal 100 and, in the case in which the portable terminal 100 supports mobile communication function, the radio communication unit 150 may include a mobile communication module. According to exemplary embodiments of the present invention, the radio communication unit 150 establishes a communication channel with the synchronization service server 200 and, depending on the communication environment, the radio communication unit 150 may be implemented with a communication module capable of Internet access or may attach to a network device connected to the Internet. The radio communication unit 150 may support transmission/reception authentication information for authentication in connection establishment process with the synchronization service server 200. The radio communication unit 150 may also transmit or receive synchronization-enabled data to or from the synchronization service server 200 at a predetermined period.

If the residual storage space is equal to or less than the threshold value, the radio communication unit 150 performs PDP context activation procedure under the control of the control unit 110. In detail, the radio communication unit 150 may transmit a signal requesting a Serving GPRS Support Node (SGSN) for PDP context activation. The radio communication unit 150 may receive a PDP context activation accept message from the SGSN. The radio communication unit 150 may transmit a Router Solicitation (RS) message to a Gateway GPRS Support Node (GGSN) and may receive a Router Advertisement (RA) message from the GGSN.

The radio communication unit 150 may receive new data (e.g., an audio file, a video file, a document file, and the like) under the control of a data download application. If a newly occurring data save request is received in the state in which the residual storage space is insufficient, the radio communication unit 150 may transmit the synchronization-incomplete data to the synchronization service server 200. In addition, if the data rate associated with the connection with the synchronization service server is equal to or greater than the threshold data rate, the radio communication unit 150 may transmit the new data to the synchronization service server 200.

The input unit 140 may include a plurality of alphanumeric and function keys for entering alphanumeric characters and for configuring various functions. The function keys may include navigation keys, side keys, and shortcut keys configured for specific functions. The input unit 140 generates key signals corresponding to the user settings and portable terminal function control and sends the generated key signals to the control unit 110. The input unit 140 can be implemented with at least one of a QWERTY keypad, a 3*4 keypad, 4*3 keypad, a ball joystick, an optical joystick, a wheel key, a touch key, a touch pad, a touchscreen, and the like. If the portable terminal 100 supports a full touchscreen function, the input unit 140 may include only the volume control keys, and power on/off key for turning on/off the screen and for turning on/off the portable terminal 100 in itself. According to exemplary embodiments of the present invention, the input unit 140 may generate an input signal for executing an application capable of commanding data storage (e.g., a still or motion picture capturing application, a data download application, a data copy/movement application, and the like), requesting for storage of new data, and terminating the application capable of commanding data storage and sends the generated input signal to the control unit 110.

The audio processing unit 160 may output various audio data configured in association with the operation of the portable terminal 100 and audio data output in playing the audio file stored in the storage unit 120, and the audio data received from an external source. The audio processing unit 160 may also support an audio data collection function. For example, the audio processing unit 160 may include a speaker (SPK) and a microphone (MIC). According to exemplary embodiments of the present invention, the audio processing unit 160 may output sound effects for providing an alarm (e.g., providing an indication to the user) that the residual storage space corresponds to an amount less than a threshold value and may provide an alarm (e.g., provide an indication to the user) of completion of storage of the new data through the speaker (SPK).

The camera unit 170 may capture a subject and convert the image into electric signals which are stored as digital data. The camera unit 170 can be implemented with a Charge Coupled Device (CCD) image sensor, a Complementary Metal Oxide Semiconductor (CMOS) image sensor, and/or the like. The camera unit 170 may capture a still or motion image. The camera unit 170 may capture high resolution (High Definition (HD) or full HD) still and motion pictures. According to exemplary embodiments of the present invention, the camera unit 170 may generate a new data (e.g., capture still picture data or recorded motion picture data) storage command and sends the generated storage command of the new data to the control unit 110 in a still or motion picture capturing mode. The new data can be stored in the data storage region 121 of the storage unit 120. If the residual storage space of the data storage region 121 is less than the threshold value and if the data rate (e.g., particularly, an upload data rate) associated with the connection with the synchronization service server 200 is greater than the threshold data rate, the new data is transmitted to the synchronization service server 200 using the radio communication unit 150 in real time and is stored in the synchronization-enabled data storage region of the synchronization service server 200.

The display unit 130 displays the information input by and presented to the user as well as various menus of the portable terminal 100. For example, the display unit 130 may display various screens in use of the portable terminal 100 such as a home screen, a menu screen, a message composition screen, a phonebook screen, a webpage screen, and the like. The display unit 130 can be implemented with any of a Liquid Crystal Display (LCD), an Organic Light Emitted Diode (OLED), and the like. If the display unit 130 is touchscreen-enabled, the display unit 130 may operate as a part of the input unit 140. According to exemplary embodiments of the present invention, the display unit 130 may provide various screen interfaces associated with the data storage function under the control of the control unit 110. For example, the display unit 130 may display an execution screen of application capable of commanding data storage, a still or motion picture capturing screen, an execution screen of a data download application, an execution screen of a data movement/copy application, and the like under the control of the control unit 110. The display unit 130 may also display a residual storage space shortage alarm message and a new data storage completion notification message. If the residual storage space acquisition speed is faster than the new data storage speed (e.g., if the data rate of the synchronization-incomplete data transfer is slower than the data rate of picture capturing), the display unit 130 displays the alarm message so as to provide notification that the residual storage space for storing the newly recorded data is insufficient and that the portable terminal 100 is securing capacity under the control of the control unit 110. For example, the display unit 130 may display an alarm message such as "Residual storage space is being recovered. Please continue picture capture in a moment."

The storage unit 120 may store the Operating System (OS) of the portable terminal 100, application programs associated with the optional functions such as audio playback, still and motion picture playback, and broadcast playback, user and application data, and the like. For example, the storage unit 120 may store video files, game file, audio files, movie files, and the like. For this purpose, the storage unit 120 may include a data storage region 121. The data storage region 121 may store the aforementioned synchronization-enable data and synchronization-disable data. The synchronization-enabled data includes the synchronization-complete data and synchronization-incomplete data. If the residual storage space is equal to or less than a predetermined threshold value, the synchronization-enabled data is deleted or moved to the synchronization service server 200 under the control of the control unit 110. The reason for deleting or moving the synchronization-enabled data to the synchronization service server 200 is to secure storage space large enough for storing newly recorded data.

The storage unit 120 may store a data storage management program. The data storage management program may determine whether the residual storage space is equal to or less than the threshold value and, if so, perform the PDP context activation procedure to secure the storage space by removing, when new data storage to be stored occurs, the synchronization-complete data or by transferring the synchronization-incomplete data to the synchronization service server 200. At this time, the data storage management program may store the new data in the data storage region. The new data storage and the storage space recovery can be performed simultaneously. The new data may be stored in the data storage region 121 with or without synchronization configuration depending on the storage path. For example, the photo taken in the still picture capture mode may be stored with or without synchronization configuration depending on whether the folder for storing the photo is of being synchronization-enabled.

After performing the PDP context activation procedure, the data storage management program measures the data rate (e.g., particularly, an upload data rate) on the connection to the synchronization service server 200. If the data rate is equal to or greater than the threshold data rate, the data storage measurement program transfers the new data to the synchronization server 200 in real time. The new data is stored in the synchronization server. At this time, the data storage management program may store the metadata of the new data in the storage unit 120. Storage of the metadata of the new data in the storage unit 120 may prevent the user from being unable to recognize the new data stored in the synchronization service server 200. Further, the metadata stored in the storage unit 120 of the portable terminal 100 may be used to notify the user of the existence of the new data, without the user having to access the synchronization service server 200. If the data rate is less than the threshold data rate, the data storage management program may delete or move the synchronization-enable data to the synchronization service server 200 to secure the storage space large enough to store the new data.

The control unit 110 may control overall operations of the portable terminal 100 and signal flows among the internal function blocks of the portable terminal and processing data. For example, the control unit 110 can be any of a Central Processing Unit (CPU) and an Application Processor. According to exemplary embodiments of the present invention, the control unit 110 may control the data storage procedure. If the residual storage space is equal to or less than the threshold value, the control unit 110 performs the PDP context activation procedure to secure the residual storage space large enough to store the newly occurring data by deleting or transferring the synchronization-enabled data to the synchronization service server 200. After performing the PDP context activation procedure, the control unit may measure the data rate (e.g., particularly, an upload data rate) on the connection to the service server 200. If the measured data rate is equal to or greater than a predetermined threshold data rage, the control unit 110 may transfer the newly occurring data to the synchronization service server 200 in real time rather than store the newly occurring data in the storage unit 120. The newly occurring data may be stored in the synchronization service server 200. A detailed description on the control unit 110 is made later with reference to FIGS. 2 to 8.

Although not depicted in FIG. 2, the portable terminal may further include at least one supplementary function module including a Global Positioning System (GPS) module for acquiring location information, a broadcast reception module for receiving broadcast signal, an audio playback module such as an MP3 module, a network module for Internet access, a motion sensor module for sensing the motion of the portable terminal 100, and the like. Although not enumerated herein, the portable terminal 100 according to exemplary embodiments of the present invention may include any of aforementioned and other equivalent components selectively.

Figure 3:
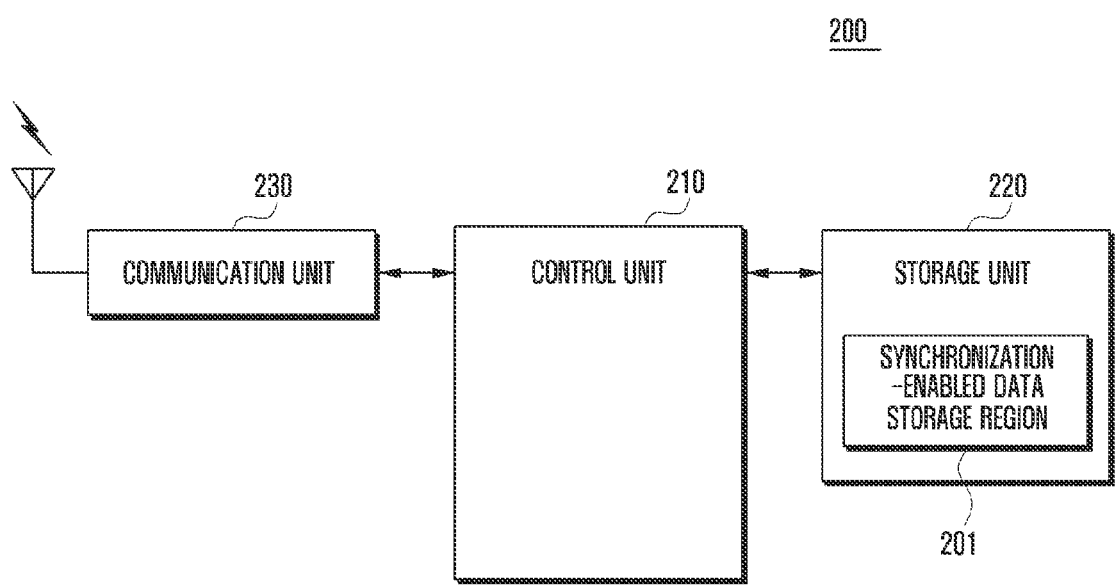
FIG. 3 is a block diagram illustrating a configuration of a synchronization service server such as, for example, the synchronization service server of FIG. 1 according to an exemplary embodiment of the present invention.

FIG. 3 is a block diagram illustrating a configuration of a synchronization service server such as, for example, the synchronization service server of FIG. 1 according to an exemplary embodiment of the present invention.

Referring to FIGS. 1 and 3, the synchronization service server 200 includes a control unit 210, a storage unit 220, and a communication unit 230. The storage unit 220 may include a synchronization-enabled data storage region 201.

The communication unit 230 may establish a communication channel with the portable terminal 100 for communicating data in data synchronization service. According to exemplary embodiments of the present invention, the communication unit 230 may receive the synchronization-incomplete data from the portable terminal 100. At this time, the receiving synchronization-incomplete data are stored in the synchronization-enabled data storage region 201 of the storage unit 220. The communication unit 230 may also receive the newly occurring data from the portable terminal 100 in real time. The communication unit 230 may also receive a synchronization configuration release message about the synchronization-complete data deleted in the portable terminal 100. The communication unit 203 may also transmit to the portable terminal 100 a message notifying of completion of storage of the synchronized data or new data.

The storage unit 220 may store the OS of the synchronization service server 200 and various application programs for providing synchronization services. For example, the storage unit 220 may store the synchronization service management program for managing access of the portable terminal 100, for authenticating the portable terminal 100, and for executing the signal received from the portable terminal. According to exemplary embodiments of the present invention, the storage unit 220 may include the synchronization-enabled data storage region 201. The synchronization-enabled data storage region 201 may store the synchronization data. The synchronization data can be synchronized with the portable terminal 100 in uni-directional or bi-directional transfer manner. Meanwhile, the synchronization configuration to the synchronization data corresponding to the synchronization data deleted or transferred from the portable terminal may be released. The storage unit 220 may store the newly occurring data transferred from the portable terminal 100 in real time without synchronization configuration.

The control unit 210 may control processing various signals generated in association with the operation of the synchronization service server 200, transferring signal, and updating and deleting data. According to exemplary embodiments of the present invention, the control unit 210 controls to store the synchronization-incomplete data transferred when the residual storage space is equal to or less than a predetermined threshold value, the synchronization option of synchronization-incomplete data being disabled before being stored in the synchronization service server 200. The control unit 210 may also control the newly occurring data transferred from the portable terminal 100 in the storage unit 220 without synchronization configuration. The control unit 210 may also control to disable the synchronization option of the synchronization data stored in the storage unit 220 which corresponds to the synchronization data deleted in the portable terminal 100. The reason for disabling the synchronization option is to prevent the residual storage space of the portable terminal 100 from being insufficient due to recurrence of synchronization with the portable terminal 100 (e.g., transferring to the portable terminal 100 again, of the deleted or transferred synchronization-enabled data and synchronization-enabled newly occurring data).

Figure 4:
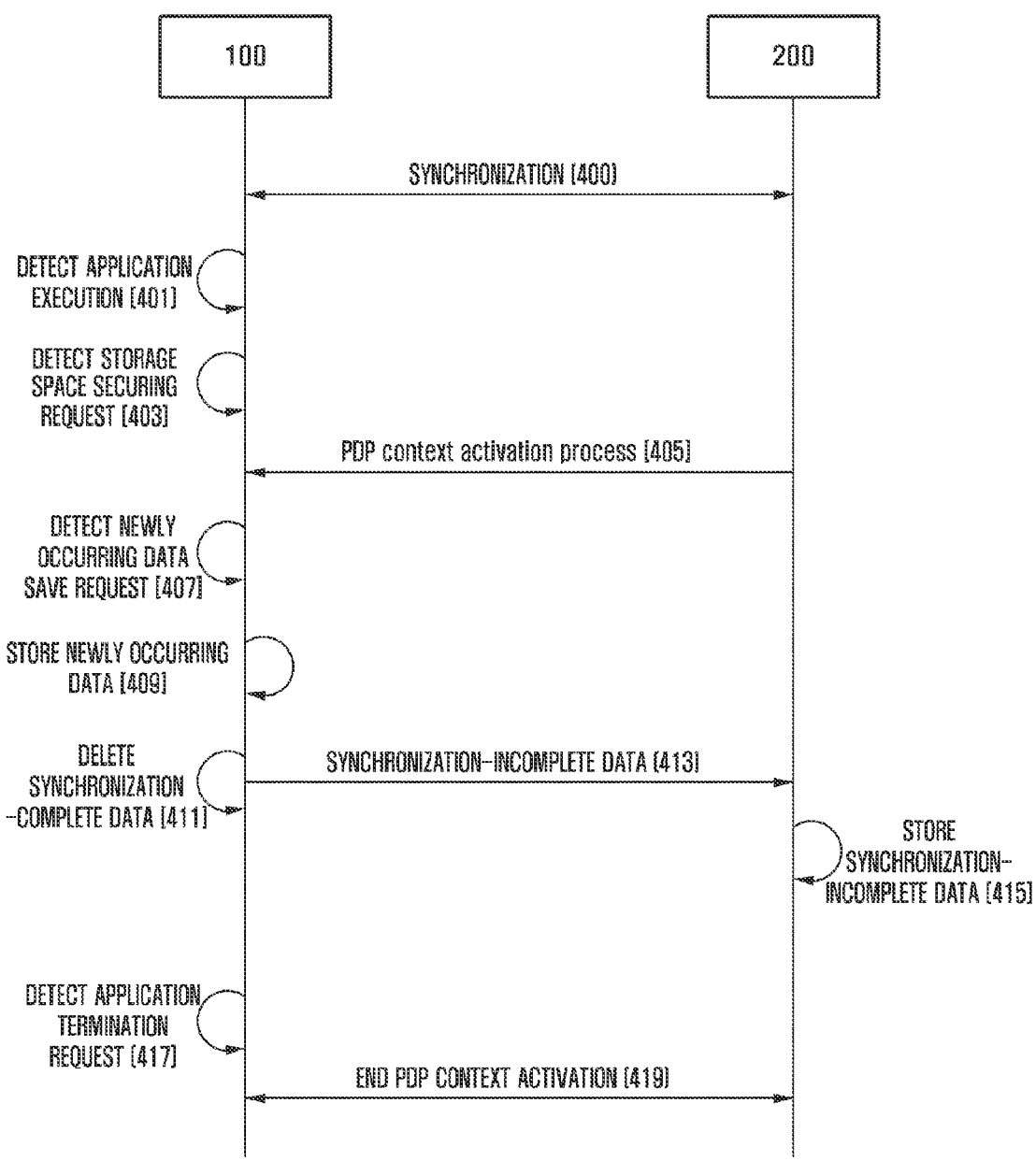
FIG. 4 is a signaling diagram illustrating signal flows between a portable terminal and a synchronization service server in a data storage method according to an exemplary embodiment of the present invention.
Figure 5:
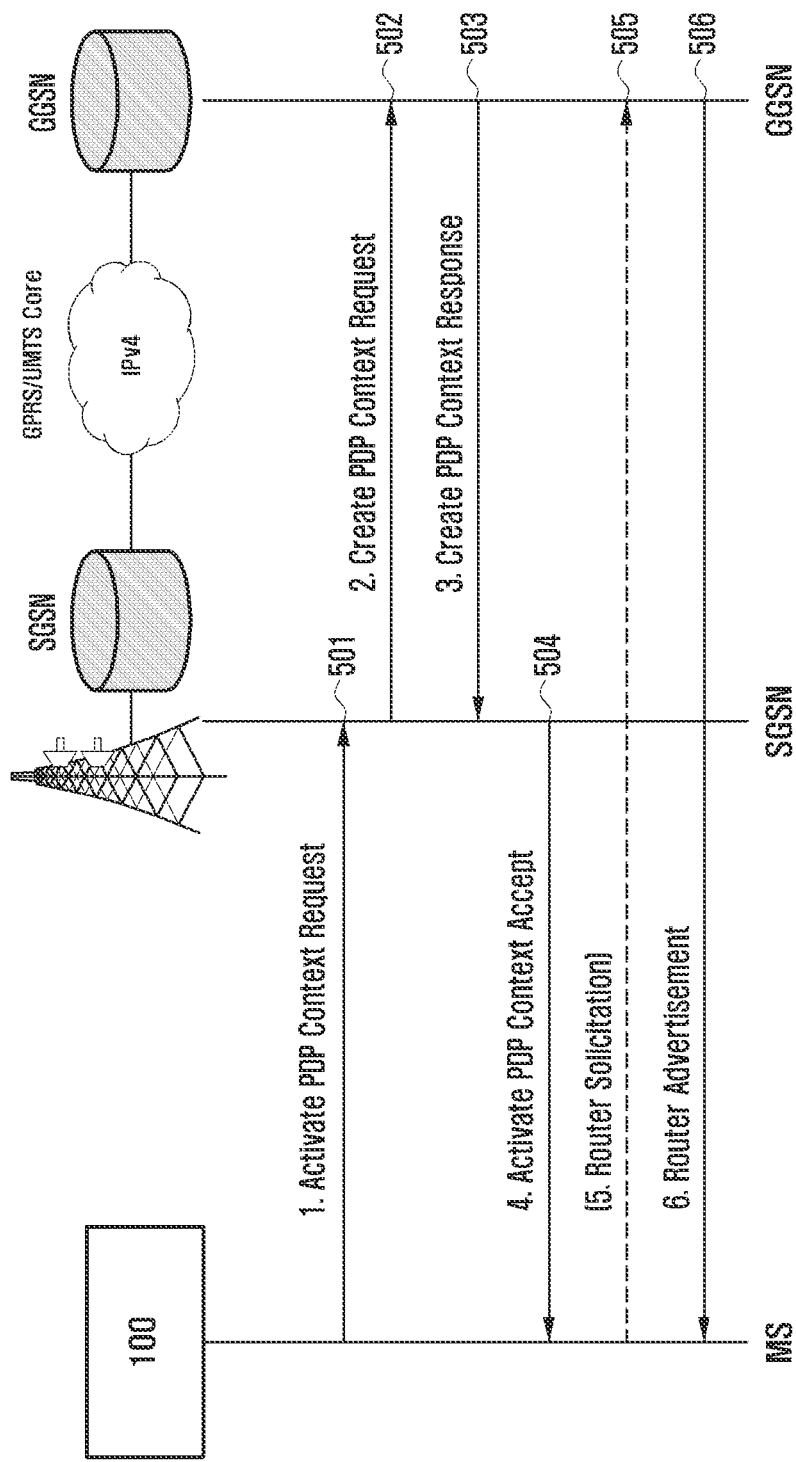
FIG. 5 is a signaling diagram illustrating a Packet Data Protocol (PDP) context activation procedure of a data storage method according to an exemplary embodiment of the present invention.

FIG. 4 is a signaling diagram illustrating signal flows between a portable terminal and a synchronization service server in the data storage method according to an exemplary embodiment of the present invention. FIG. 5 is a signaling diagram illustrating a PDP context activation procedure of a data storage method according to an exemplary embodiment of the present invention.

Referring to FIGS. 1 to 5, the portable terminal 100 according to exemplary embodiments of the present invention performs data synchronization with the synchronization service server 200 at step 400. At this time, the synchronization can be performed periodically or triggered when modification is detected in the synchronization-enabled data.

At step 401, the portable terminal 100 may detect execution of an application generating a command for storing data. This application can be a still or motion picture capturing application, an audio and video file download application, or a copy application for copying data from a first storage medium to a second storage medium. The first and second storage media can be separated physically or logically.

The portable terminal 100 may detect the storage space-securing request at step 403. The storage space-securing request is generated when the residual storage space of the data storage region 121 of the storage unit 120 is equal to or less than a predetermined threshold value. For example, the portable terminal 100 can be configured to determine the necessity of securing storage space when the residual data storage space is equal to or less than 10 Megabytes (MB). The threshold value can be set differently depending on the currently running application. For example, the threshold value can be set to a value relatively small (e.g., 10 MB) enough to store a few still pictures for the still picture capturing application, or the threshold value can be set to a value relatively large (e.g., 100 MB) enough to store a few minutes of motion picture. The threshold value can be set to a value large (e.g., 500 MB) for storing data corresponding to a few minutes of download for the data download application or a few minutes (e.g., 100 MB) of copy/movement for the data copy/movement application.

If the storage space-securing request is detected, the portable terminal 100 performs the PDP Context Activation procedure (e.g., the data communication channel establishment preparation procedure), at step 405. The PDP context activation procedure is performed as shown in FIG. 5.

Referring to FIG. 5, the portable terminal 100 requests the SGSN for PDP context activation at step 501. The SGSN generates a PDP context request message to the GGSN at step 502. The GGSN generates a PDP context response to the SGSN at step 503. The SGSN sends the portable terminal 100 a PDP context accept message at step 504. The portable terminal 100 sends the GGSN a Router Solicitation (RS) message at step 505, and the GGSN sends the UE a Router Advertisement (RA) message at step 506. According to an exemplary embodiment of the present invention, the data upload to the synchronization service server 200 may be prepared in this way.

After the PDP context activation procedure has completed, the portable terminal 100 detects a newly occurring data save request at step 407. If the photo capturing application is running, the newly occurring data save request is generated in taking a photo by means of the camera unit 170 or in receiving a save command input. The newly occurring data save request may also be generated when a download command is input while the data download application is running or when a data copy/move command is input while the data copy/move application is running.

The portable terminal 100 stores the newly occurring data at step 409. The portable terminal 100 deletes the synchronization-complete data at step 411 and transfers the synchronization-incomplete data to the synchronization service server 200 at step 413. The reason for deleting the synchronization-complete data is to secure the residual storage space to the level equal or greater than the threshold value. According to exemplary embodiments of the present invention, the portable terminal 100 may delete all the synchronization-complete data. The portable terminal 100 may also delete as little of the synchronization-complete data as possible to secure the residual storage space to the level equal to or greater than the threshold value. For example, if the threshold value is 10 MB for the photo shooting application which is running currently and if 5 MB data is generated through photo shooting, the control unit 110 deletes the least amount of synchronization-complete data required to secure the residual storage space of at least 5 MB. At this time, the control unit 110 is capable of deleting the synchronization-complete data in a lowest priority first order. For example, if the synchronization-complete data with the lowest priority is 1 MB, if the synchronization-complete data with the second lowest priority is 3 MB, and if the synchronization-complete data with the third lowest priority is 2 MB, then the portable terminal 100 deletes the synchronization-complete data with the three lowest priorities. For example, the portable terminal 100 secures further storage space of 6 MB such that the residual storage space becomes 11 MB which is greater than the threshold value. The synchronization-incomplete data transfer procedure can be performed in similar manner to the synchronization-complete data deletion procedure so as to transfer the synchronization-incomplete data entirely or as little as possible to secure the residual storage space to the level equal to or greater than the threshold value in an order of priority through the radio communication unit 150. The synchronization-complete data deletion and synchronization-incomplete data transfer procedure may be repeated until the photo capturing application is terminated. The priority can be determined based on the usage frequency and/or storage date of the synchronization-enabled data (synchronization-complete data).

If the synchronization-complete data is configured with bi-directional synchronization option, it may be preferred for the portable terminal 100 to transmit a synchronization configuration release message to the synchronization server 200 to prevent synchronization-complete data stored in the synchronization service server 200 from being deleted. Similarly, the portable terminal 100 may send the synchronization service server 200 a synchronization configuration release message.

The synchronization service server 200 may store the received synchronization-incomplete data at step 415. Afterward, the synchronization service server 200 may send the portable terminal 100 a message notifying that the synchronization-incomplete data has been stored successfully. The portable terminal 100 detects the termination of the application at step 417. If the application termination is detected, the portable terminal 100 ends the PDP context activation procedure at step 419.

Although FIG. 4 is directed to the case in which the newly occurring data is stored in the portable terminal 100, exemplary embodiments of the present invention are not limited thereto. In another exemplary embodiment of the present invention, after the execution of PDP context activation procedure at step 405, the portable terminal 100 measures the data rate and, if the data rate is equal to or greater than the predetermined threshold data rate, the portable terminal 100 sends the newly occurring data to the synchronization service server 200 in real time and stores the metadata of the newly occurring data in the portable terminal 100. Meanwhile, if the data rate is less than the threshold data rate, steps 409 to 415 can be performed according to another exemplary embodiment of the present invention.

FIG. 6 is a flowchart illustrating a data storage method of a portable terminal according to a first exemplary embodiment of the present invention.

Referring to FIGS. 1 to 6, the control unit 110 of the portable terminal 100 detects the execution of the application commanding data storage at step 601. As described above, the application can be any of a still or motion picture capturing application, data download application, and data copy/move application.

Next, the control unit 110 determines whether the residual storage space of the data storage region 121 of the storage unit 120 is equal to or less than the threshold value at step 603. The threshold value may be determined differently depending on the currently running application. For example, the threshold value can be set to the amount corresponding to a few pictures (e.g., 10 MB) for the picture capturing application or a few minutes of motion picture (e.g., 100 MB) for the motion picture capturing application. In addition, the threshold value can be set to the download amount of a few minutes (e.g., 500 MB) for the data download application and copy/movement amount of a few minutes (e.g., 100 MB) for the data copy/move application.

If the residual storage space is equal to or less than the threshold value at step 603, then the control unit 110 proceeds to step 605 at which the control unit 110 performs the PDP context activation procedure. For example, the control unit 110 controls the radio communication unit 150 to be in the state capable of transmitting (uploading) the synchronization-enabled data immediately. Next, the control unit 110 determines whether a newly occurring data save request is detected at step 607. For example, the control unit 110 may determine whether there is a need of storing a newly captured picture. The newly captured picture may be stored automatically or manually depending on the settings of the portable terminal 100. In detail, if the auto-save function is on, the newly taken picture save request is generated by the control unit 110 automatically. Otherwise, if the auto save function is off, the newly taken picture save request is generated by a key input (e.g., input associated with an OK key).

If a newly occurring data save request is not detected at step 607, the control unit 110 proceeds to step 613. Otherwise, if a newly occurring data save request is detected at step 607, the control unit 110 proceeds to step 609 at which the control unit 110 deletes the synchronization-complete data among the synchronization-enabled data or transfers the synchronization-incomplete data to the synchronization service server 200. The reason for this is to secure the storage space for storing the newly occurring data. The description on the storage space-securing method is made later with reference to FIG. 7.

The control unit 110 stores the newly occurring data in the residual storage space of the data storage region of the storage unit 120 at step 611. Although FIG. 6 is depicted such that step 611 follows step 609, exemplary embodiments of the present invention are not limited thereto. For example, exemplary embodiments of the present invention can be implemented (programmed) in such a way that steps 609 and 611 may be performed simultaneously or step 611 may be followed by step 609.

Next, the control unit 110 determines whether an application termination command is detected at step 613. If no application termination command is detected at step 613, then the control unit 110 returns the procedure to step 607 to repeat the above-described steps. Otherwise, if the application termination command is detected at step 613, then the control unit 110 proceeds to step 615 at which the control unit 110 ends the PDP context activation procedure.

In contrast, if the residual storage space is greater than the threshold value at step 603, the control unit 110 proceeds to step 617 at which the control unit 110 determines whether a newly occurring data save request is detected. If no newly occurring data save request is detected at step 617, the control unit 110 proceeds to step 621. Otherwise, if the newly occurring data save request is detected at step 617, the control unit 110 proceeds to step 619 at which the control unit 110 stores the newly occurring data. Thereafter, the control unit 110 determines whether an application termination command is detected at step 621. If no application termination command is detected at step 621, the control unit 110 returns the procedure to step 603 to repeat the above-described steps. Otherwise, if the application termination command is detected at step 621, the control unit 110 ends the data storage procedure.

As described above, the data storage method according to exemplary embodiments of the present invention is performed in such a way of securing extra storage space, when the residual storage space is equal to or less than a threshold value, by deleting or transferring the synchronization-enable data to the synchronization server 200 so as to avoid unintended storage failure. Because the data storage method according to exemplary embodiments of the present invention performs the PDP context activation procedure for establishing data communication channel to transfer the synchronization-enable data at the time when the residual storage space becomes equal to or less than the threshold value, the time required for securing the extra storage space may be minimized. For example, exemplary embodiments of the present invention may be capable of minimizing the time required for transferring the synchronization-enable data to the synchronization service server 200. If the PDP context activation procedure is not performed in advance, the control unit 110 has to perform the PDP context activation procedure with the synchronization service server 200 to establish the data communication channel and then transfer the synchronization-enabled data to the synchronization service server 200. In contrast to the case of performing the PDP context activation procedure in advance, the PDP context activation procedures not being performed in advance may result in a time delay as much as the PDP context activation procedure in transferring the synchronization-enabled data to the synchronization service server 200.

FIG. 7 is a flowchart illustrating an extra storage space securing procedure of a data storage method according to an exemplary embodiment of the present invention.

Referring to FIGS. 1 and 7, the control unit 110 of the portable terminal 100 according to an exemplary embodiment of the present invention detects a newly occurring data save command at step 701.

If the newly occurring data save command is detected at step 701, the control unit 110 determines whether the synchronization-incomplete data exists among the synchronization-enabled data at step 703.

If the synchronization-incomplete data is determined not to exist at step 703 (e.g., if all synchronization-enable data has been synchronized), then the control unit 110 proceeds to step 705 at which the control unit 110 deletes the entire synchronization-complete data. At this time, the control unit 110 is capable of deleting the synchronization-complete data entirely. The control until 110 may also delete the synchronization-complete data in an order of priority until the residual storage space becomes greater than the threshold value. For example, if 5 MB extra storage space is required to secure the residual storage space equal to the threshold value, and the three synchronization-complete data with lowest priorities are 3 MB, 1 MB, and 2 MB in size, the control unit 110 may delete the three synchronization-complete data to secure the extra storage space of 5 MB.

If the synchronization-incomplete data is determined to exist at step 703, then the control unit 110 proceeds to step 707 at which the control unit 110 determines whether all the synchronization-enabled data are synchronization-incomplete data.

If all the entire synchronization-enabled data are determined to be the synchronization-incomplete data at step 707, then the control unit 110 proceeds to step 709 at which the control unit 110 transfers the synchronization-incomplete data to the synchronization service server 200. At this time, the control unit 110 is capable of deleting the entire synchronization-incomplete data transferred to the synchronization service server 200. The control unit 110 may also transfer the synchronization-incomplete data to the synchronization service server 200 in a lowest priority first order until the residual storage space becomes equal to or greater than the threshold value.

Otherwise, if not all the entire synchronization-enabled data are determined to be the synchronization-incomplete data (e.g., if the synchronization-complete data and synchronization-incomplete data coexist), then the control unit 110 proceeds to step 711 at which the control unit 110 deletes the synchronization-complete data. At this time, the control unit 110 may delete the synchronization-complete data entirely or sequentially in an order of priority as described above.

Thereafter, the control unit 110 determines whether the residual storage space (after deleting the synchronization-complete data) is less than the threshold value at step 713.

If the residual storage space is determined to be less than the threshold value at step 713, then the control unit 110 proceeds to step 709 at which the control unit 110 transfers the synchronization-incomplete data to the synchronization service server 200.

If the residual storage space is determined to be less than the reference value even after deleting and/or transferring the synchronization-enable data (synchronization-complete data and synchronization-incomplete data) entirely, the control unit 110 determines whether there is synchronization-disable data among the data stored in the data storage region 121 and, if so, displays a popup window notifying the user of the lack of residual storage space and display a popup window asking whether to configure synchronization option of the synchronization-disabled data. Afterward, if a signal requesting for enabling synchronization of synchronization-disabled data is input, the control unit 110 resets the synchronization-disabled data to the synchronization-enabled data to be transferred to the synchronization service server 200. According to another exemplary embodiment of the present invention, the control unit 110 may reset the synchronization-disabled data to the synchronization-enabled data entirely or in partial without presenting any popup window asking whether to resets the synchronization-disabled data.

FIG. 8 is a flowchart illustrating a data storage method of a portable terminal according to a second exemplary embodiment of the present invention.

Referring to FIGS. 1 and 8, the control unit 110 of the portable terminal 100 according to the second exemplary embodiment of the present invention executes an application capable of generating a data storage command at step 801. The application can be a still or motion picture capturing application, a data download application, or a data copy/move application.

If the application capable of generating a data storage command is executed at step 801, the control unit 110 proceeds to step 803 at which the control unit 110 determines whether the residual storage space is equal to or less than a predetermined threshold value. If the residual storage space is determined to be greater than the threshold value at step 803, the control unit 110 proceeds to step 617 of FIG. 6. Otherwise, if the residual storage space is determined to be equal to or less than the threshold value, the control unit 110 proceeds to step 805 at which the control unit 110 performs the PDP context activation procedure (procedure for preparing data communication channel establishment).

Thereafter, the control unit 110 measures upload data rate at step 807.

Next, the control unit 809 determines whether a newly occurring data save request is detected at step 809.

If no newly occurring data save request is detected at step 809, the control unit 110 proceeds to step 817. Otherwise, if the newly occurring data save request is detected at step 809, the control unit 110 proceeds to step 811 at which the control unit 110 determines whether a real time transfer is possible. For example, the control unit 110 determines whether the measured upload data rate is equal to or greater than a predetermined threshold data rate. If the upload data rate is less than the threshold data rate (e.g., if a real time transfer is impossible), the control unit 110 proceeds to step 609 of FIG. 6. Otherwise, if the upload data rate is equal to or greater than the threshold data rate (e.g., if the real time transfer is possible), the control unit 110 proceeds to step 813 at which the control unit 110 transfers (e.g., uploads) the newly occurring data to the synchronization service server 200.

Thereafter, the control unit 110 stores the metadata of the data transferred to the synchronization service server 200 in the storage unit 120 at step 815. The reason for storing the metadata of the data transferred to the synchronization service server 200 is to notify the user of the information on the data transferred to and stored in the synchronization service server 200 schematically without requiring connection to the synchronization service server.

Thereafter, the control unit 110 determines whether an application termination signal is detected at step 817. If no application termination signal is detected at step 817, the control unit 110 returns the procedure to the step 807 to repeat the above-described steps. Otherwise, if the application termination signal is detected at step 817, the control unit 110 proceeds to step 819 at which the control unit 110 ends the PDP context activation.

The data storage method according to exemplary embodiments of the present invention may store the newly occurring data in the synchronization service server 200 rather than in the storage region 121 of the storage unit 120 of the portable terminal in the 3.5G, 4G, 5G or beyond high speed communication systems such as Wireless Broadband Internet (WiBro), Long Term Evolution (LTE), LTE-advanced (LTE-A), WiBro Evolution, and the like, thereby overcoming the problem of newly occurring data-storage failure caused by the lack of residual storage space.

As described above, the data storage method and system of the portable terminal according to exemplary embodiments of the present invention may prevent the newly occurring data from being lost unintentionally due to the lack of the residual storage space in such a way of securing, when the residual storage space is equal to or less than a predetermined threshold value, extra storage space by deleting and/or transferring the synchronization-enable data to the synchronization service server.

The data storage method and system according to exemplary embodiments of the present invention may reduce (e.g., minimize) the time required for securing the extra storage space by performing the PDP Context Activation procedure, (e.g., preparation for data communication channel establishment), in advance.

Furthermore, the data storage method and system according to exemplary embodiments of the present invention may store the newly occurring data in the synchronization service server rather than in the portable terminal in such a way of measuring the data rate (upload data rate) when the residual storage space is equal to or less than the threshold value and transferring the newly occurring data to the synchronization service server when the upload data rate is high enough for real time data transfer, thereby overcoming the problem of the newly occurring data storage failure caused by the lack of residual storage space.

The above-described data storage method according to exemplary embodiments of the present invention can be recorded in a non-transient computer-readable storage media in the form of program commands executable by means of various types of computing means. The non-transient computer-readable storage media can store the program commands, data files, and data structures independently or in the form of their combination. The program commands recorded in the storage media can be designed and configured for dedicated use in exemplary embodiments of the present invention or the ones well-known to those in the computer software field. The computer-readable media may be magnetic media such as a hard disk, a floppy disk and magnetic tape, optical media such as a Compact Disk Read-Only Memory (CD-ROM) and a Digital Versatile Disk (DVD), magneto-optical media such as floptical disk, and hardware devices such as a ROM, a Random-Access Memory (RAM), a flash memory, and the like particularly implemented to store and execute program commands The program commands may be machine language codes produced by a compiler and high-level language codes that can be executed by computers using an interpreter, and the like. In order to perform the operations according to exemplary embodiments of the present invention, the hardware devices may be implemented to operate as at least one software module, and vice versa.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A data storage method of a portable terminal, the method comprising:
   detecting, by a control unit, an execution of an application operable to save data;
   in response to the execution of the application, determining, by the control unit, whether a residual storage space of a data storage region of the portable terminal is equal to or less than a predetermined threshold value;
   establishing, when the residual storage space is equal to or less than the predetermined threshold value, a connection with a predetermined synchronization service server through a radio communication unit under the control of the control unit;
   increasing the residual storage space to be greater than the predetermined threshold value by at least one of deleting synchronization-complete data among synchronization-enabled data stored in the portable terminal and transferring synchronization-incomplete data to the predetermined synchronization service server under the control of the control unit after a completion of the establishing the connection with a predetermined synchronization service;
   detecting, by the control unit, a save command for storing new data generated through the executed application after increasing the residual storage space; and
   storing, in response to the detected save command, the new data in the increased residual storage space of the portable terminal,
   wherein the predetermined threshold value is set to a value depending on a size of the new data generated by the executed application.

2. The method of claim 1, wherein the increasing the residual space to be greater than the predetermined threshold value comprises:
   determining, by the control unit, whether the synchronization-incomplete data exists among the synchronization-enabled data; and
   deleting, by the control unit, when the synchronization-incomplete data is determined not to exist among the synchronization-enabled data, the synchronization-complete data.

3. The method of claim 1, wherein the increasing the residual space to be greater than the predetermined threshold value comprises:
   determining, by the control unit, when the synchronization-incomplete data is determined to exist among the synchronization-enabled data, whether all the synchronization-enabled data corresponds to the synchronization-incomplete data;
   transferring, when all the synchronization-enabled data is determined to correspond to the synchronization-incomplete data, the synchronization-incomplete data to the synchronization service server under the control of the control unit;
   deleting, by the control unit, when all of the synchronization-enabled data is determined not to correspond to the synchronization-incomplete data, the synchronization-complete data; and
   transferring, when the residual storage space is less than the threshold value after deleting the synchronization-complete data, the synchronization-incomplete data to the synchronization service server under the control of the control unit.

4. The method of claim 1, wherein the increasing the residual space to be greater than the predetermined threshold value comprises:
   deleting, by the control unit, the synchronization-complete data in an order of priority until the residual storage space becomes greater than the threshold value; and
   transferring the synchronization-incomplete data to the synchronization service server in an order of priority until the residual storage space becomes greater than the threshold value under the control of the control unit.

5. The method of claim 1, further comprising:
   determining, by the control unit, when the residual storage space is less than the predetermined threshold value after the at least one of the deleting and the transferring all the synchronization-enabled data, whether synchronization-disabled data exists;
   determining, by the control unit, when the synchronization-disabled data is determined to exist, whether the synchronization-disabled data is reset to the synchronization-enabled data; and
   transferring, when the synchronization-disabled data is determined to be reset to the synchronization-enabled data, the synchronization-disabled data to the synchronization service server under the control of the control unit.

6. The method of claim 1, further comprising:
   measuring, by the control unit, an upload data rate between the synchronization service server and the portable terminal;
   determining, by the control unit, when the save command for storing the new data is detected, whether the upload data rate is greater than a predetermined threshold data rate;
   when the upload data rate is determined to be greater than the predetermined threshold data rate, transferring the new data to the synchronization service server and storing metadata of the new data under the control of the control unit; and
   when the upload data rate is determined to be less than the predetermined threshold data rate, storing, by the control unit, the new data in the residual storage space and increasing the residual storage space to be greater than the predetermined threshold value by the at least one of deleting the synchronization-enabled data and transferring the synchronization-enabled data to the synchronization service server.

7. The method of claim 1, wherein the determining whether the residual storage space is equal to or less than the predetermined threshold value is triggered when an application capable of generating the save command is executed.

8. A data storage system comprising:
   a portable terminal including a transceiver, a memory, an input device, and a control unit, the portable terminal configured to:
     detect an execution of an application operable to save data,
     determine, in response to the execution of the application, whether a residual storage space of a data storage region of the portable terminal is equal to or less than a predetermined threshold value,
     establish, when the residual storage space is equal to or less than the predetermined threshold value, a connection with a predetermined synchronization service server in response to the execution of the application, increase the residual storage space to be greater than the predetermined threshold value by at least one of deleting synchronization-complete data among synchronization-enabled data stored in the portable terminal and transferring synchronization-incomplete data to the predetermined synchronization service server under the control of the control unit after completing the establishing of the connection with a predetermined synchronization service, detect a save command for storing new data generated through the executed application after increasing the residual storage space, and store, in response to the detected save command, the new data in the increased residual storage space of the portable terminal; and a synchronization service server comprising a transceiver and a storage unit, the synchronization service server configured to store the synchronization-enabled data transferred by the portable terminal, wherein the predetermined threshold value is set to a value depending on a size of the new data generated by the executed application.

9. The data storage system of claim 8, wherein the portable terminal is further configured to:

measure an upload data rate with the synchronization service server, transfer, when the upload data rate is determined to be greater than a predetermined threshold data rate, the new data to the synchronization service server, and store metadata of the new data.

10. The data storage system of claim 8, wherein the portable terminal is further configured to perform the at least one of deleting the synchronization-complete data in an order of priority until the residual storage space becomes greater than the predetermined threshold value and transferring the synchronization-incomplete data to the synchronization service server in an order of priority until the residual storage space of the portable terminal becomes equal to or greater than the predetermined threshold value.

11. The data storage system of claim 8, wherein the portable terminal is further configured to:

determine, when the residual storage space of the portable terminal is less than the threshold value after the at least one of deleting and transferring all the synchronization-enabled data, whether synchronization-disabled data exists, determine, when the synchronization-disabled data is determined to exist, whether the synchronization-disabled data is reset to the synchronization-enabled data, and transfer, when the synchronization-disabled data is determined to be reset to the synchronization-enabled data, the synchronization-disabled data to the synchronization service server.

12. A portable terminal comprising:

a transceiver configured to connect a communication channel with a predetermined synchronization service server for communicating synchronization-enabled data;

a memory having a data storage region;

an input device configured to detect an execution of an application and a save command for storing new data of the application; and a control unit comprising a processor configured to:

detect an execution of an application operable to save data, determine, in response to the execution of the application, whether a residual storage space of a data storage region of the portable terminal is equal to or less than a predetermined threshold value, establish, when the residual storage space is equal to or less than the predetermined threshold value, the communication channel, increase the residual storage space to be greater than the predetermined threshold value by at least one of deleting synchronization-complete data among synchronization-enabled data stored in the portable terminal and transferring synchronization-incomplete data to the predetermined synchronization service server under the control of the control unit after completing the establishing of the connection with a predetermined synchronization service, detect the save command for storing the new data generated through the executed application after increasing the residual storage space, and store, in response to the save command, the new data in the residual storage space, wherein the predetermined threshold value is set to a value depending on a size of the new data generated by the executed application.

13. The portable terminal of claim 12, wherein the processor is further configured to:

determine whether the synchronization-incomplete data exists among the synchronization-enabled data, and delete, when the synchronization-incomplete data is determined not to exist among the synchronization-enabled data, the synchronization-complete data to increase the residual storage space to become equal to or greater than the predetermined threshold value.

14. The portable terminal of claim 13, wherein the processor is further configured to:

determine when the synchronization-incomplete data is determined to exist among the synchronization-enabled data, whether all the synchronization-enabled data corresponds to synchronization-incomplete data, and transfer, when all the synchronization-enabled data is determined to correspond to synchronization-incomplete data, the synchronization-incomplete data to the synchronization service server to increase the residual storage space to be equal to or greater than the predetermined threshold value.

15. The portable terminal of claim 14, wherein the processor is further configured to:

delete, when all of the synchronization-enabled data is determined not to correspond to synchronization-incomplete data, the synchronization-complete data and transfer, when the residual storage space is less than the threshold value after deleting the synchronization-complete data, the synchronization-incomplete data to the synchronization service server.

16. The portable terminal of claim 12, wherein the processor is further configured to delete the synchronization-complete data in an order of priority until the residual storage space becomes greater than the predetermined threshold value.

17. The portable terminal of claim 12, wherein the processor is further configured to transfer the synchronization-incomplete data to the synchronization service server in an order of priority until the residual storage space becomes greater than the predetermined threshold value.

18. The portable terminal of claim 12, wherein the processor is further configured to:

measure an upload data rate between the synchronization service server and the portable terminal, determine, when the save command is detected, whether the upload data rate is greater than a predetermined threshold data rate, when the upload data rate is determined to be greater than the predetermined threshold data rate, transfer the new data to the synchronization service server and store metadata of the new data, and when the upload data rate is determined to be less than the predetermined threshold data rate, store the new data in the residual storage space and increase the residual storage space to be greater than the predetermined threshold value by the at least one of deleting the synchronization-enabled data and transferring the synchronization-enabled data to the synchronization service server.

19. The portable terminal of claim 12, wherein the processor is further configured to:

determine, when the residual storage space is less than the predetermined threshold value after deleting or transferring all the synchronization-enabled data, whether the synchronization-disabled data exists, determine, when the synchronization-disabled data is determined to exist, whether the synchronization-disabled data is reset to the synchronization-enabled data, and transfer, when the synchronization-disabled data is determined to be reset to the synchronization-enabled data, the synchronization-disabled data to the synchronization service server.

* * * * *